Figures 1, 2:
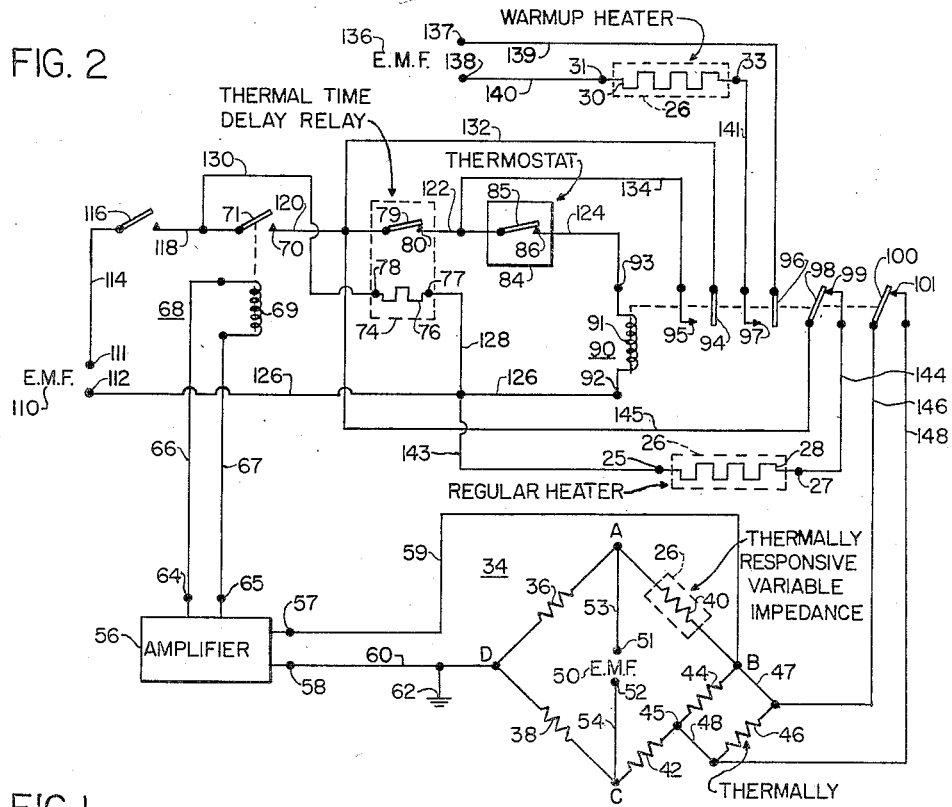

March 4, 1958 — R. T. SCOTT — 2,825,789
CONTROL APPARATUS
Filed Dec. 28, 1956

INVENTOR.
ROBERT T. SCOTT
BY Roger W. Jensen
ATTORNEY

United States Patent Office 2,825,789
Patented Mar. 4, 1958

2,825,789

CONTROL APPARATUS

Robert T. Scott, Minneapolis, Minn., assignor to Minneapolis-Honeywell Regulator Company, Minneapolis, Minn., a corporation of Delaware Application December 28, 1956, Serial No. 631,170

8 Claims. (Cl. 219—20)

This invention pertains generally to apparatus of the temperature control type and has specific application to the field of "floated" gyros. Floated gyros are widely used in present control systems for dirigible craft as well as for other dynamic control systems. Floated gyros may be defined as comprising a hermetically sealed gimbal member containing a gyroscopic spin member with the gimbal member floated in a fluid of the proper density and viscosity. The density of the fluid is matched with the average density of the gimbal so that the gimbal is substantially neutrally suspended in the fluid. Accordingly, very delicate bearings may be provided to journal the gimbal for rotation about the gimbal axis, or output axis. The delicate bearings are permitted due to the fact that substantially all of the gimbal weight is supported by the fluid. The delicate bearings in turn offer very low friction to rotation of the gimbal about its output axis and accordingly eliminate a serious source of error. The fluid in which the gimbal is floated, in addition to supporting the gimbal in neutral suspension, may also serve as an integration means as is well understood in the gyro art. Briefly stated, a floated gyroscope in one of its applications responds to angular rate of change of the device about the gyro input axis (the gyro input axis being perpendicular to both the spin axis and output axis). Said response results in precession of the gimbal about its output axis, the viscous fluid performing an integrating function so that the total displacement of the gimbal about its output axis is a measure of the time integral of said angular rate of change, and hence measures the total angular displacement about the input axis.

The angular rotation of the gimbal about its output axis for a unit angular rotation of the gyro about its input axis is a measure of the gimbal transfer function. Thus the gimbal transfer function may be represented by the ratio $$\frac{\theta_0}{\theta_i}$$

where $\theta_0$ is rotation of the gimbal about the output axis and $\theta_i$ is the gyro input angle or the rotation of the gyro about its input axis, which causes the gimbal to rotate an angular amount of $\theta_0$. The gimbal transfer function is equal to $$\frac{H}{C}$$

where H is the gyro angular momentum and C is the viscous damping coefficient. Normally H is held constant by close control of rotor speed. C, the viscous damping coefficient, varies inversely with temperature, and adjustment of the gyro temperature (and hence that of the damping fluid) will give the desired gimbal transfer function.

Floated gyroscopes are extremely accurate devices only when the gimbal transfer function remains constant at its correct value which it will as long as the temperature of the gyro fluid is at the correct point. The fluids in which the gimbals are floated are quite temperature sensitive in that their viscosity will vary considerably with changes in temperature. Accordingly, in prior art floated gyroscopes it has been customary to provide thermostatically controlled heating means for maintaining the temperature of the gyro fluid at an optimum point.

In many present applications of floated gyroscopes, the system and/or device in which the floated gyroscope is used is quite often "stored" in ambient temperatures considerably below the desired operating temperature of the floated gyroscope. Thus, when it is desired to use a system which has been stored at a low ambient temperature, it is first necessary to warm up the gyro to the point wherein the gimbal transfer function is at the correct value before the system can be used. Depending upon the ambient temperature, the warm up time can be quite lengthy and in some systems the lengthy warmup time cannot be tolerated.

In an attempt to reduce the length of time required to bring the gyro up to operating temperature, some prior art floated gyroscopes have been equipped with auxiliary heating means which increase the amount of power dissipated in the gyro to bring the gyro up to temperature. However, these prior arrangements suffer from the fact that while they may be satisfactory for one particular ambient starting temperature, they are unsatisfactory for other ambient starting temperatures in that they cause the gimbal transfer function to overshoot and actually increase the length of time required to bring the gyroscope to the desired operating temperature. For example, in one size gyro in use at the present time an auxiliary or warm up heater having a wattage dissipation of 350 watts is required in order to bring the gyro up to desired operating temperatures in five minutes from a starting point of 65° Fahrenheit. In higher ambient temperatures, however, use of the 350 watt heater for the first heater cycle results in an overshoot in the gimbal transfer function. At first this overshoot is not objectionable; but as the ambient temperature continues to increase the overshoot becomes very large.

The present invention is concerned with providing a regular stand-by heater for controlling the temperature of the gyroscope and in addition providing a warm up heater which also is effective to affect the temperature of the gyro. The invention further includes thermostatic means for controlling the energization of the warm up heater so that if the ambient temperature is below a certain point which will be referred to below as a "break point" then the warm up heater will be used but if the ambient temperature is above this point then the warm up heater will not be used. This arrangement tends to prevent the gyro transfer function from over shooting if the initial ambient temperature is above the "break point." The invention further includes a network for controlling an amplifier which in turn controls the energization to both the regular and the warm up heaters. The special network includes a pair of thermally responsive variable impedances, one of which is exposed to the ambient temperature and the other of which is exposed to the internal temperature of the gyro. Under normal operating conditions it is the internal impedance which ultimately controls the energization of the regular heater. The first variable impedance exposed to the ambient temperature is normally disabled so that the balance of the network is affected only by the variable impedance contained within the gyroscope. However, if the ambient temperature is below the "break point" then when the warm up heater is energized the thermally responsive variable impedance exposed to the ambient will be rendered effective and will tend to shift the control point of the network by an amount proportional to the ambient temperature. The shift in the control point is in such a direction so as to tend to run the gyro at a temperature inversely proportional to the ambient temperature. Thus, the lower the ambient temperature, the higher the control point will be raised, thus tending to make the transfer function overshoot its rated value. Actually, the overall effect on the transfer function is not to cause it to overshoot due to the fact that there are certain temperature gradients within the gyroscope. To explain, it will be appreciated that when heat is applied to a body, the body does not heat up at a uniform rate but depending upon the composition thereof will have a variation in temperature in different parts of the body. So too when heat is applied to a housing containing a gimbal assembly floated in viscous liquid temperature gradients will be created due to different rates of heat transfer in the various portions of the device. The variable impedance sensing element positioned within the gyroscope will have to be subjected to a higher than normal temperature in order to bring the bridge network to balance when the variable impedance sensing element exposed to the ambient is rendered effective but due to the temperature of other parts of the assembly being lower than that of the sensing element the overall transfer function will not overshoot but will be brought close to the desired value in less time than it would if the variable impedance sensing element exposed to the ambient were not used.

The invention further includes means for permanently disabling the external variable impedance means once the bridge network has been brought to a balanced condition and effectively locking it out of the circuit thereafter, the auxiliary or warm up heater also being locked out of the control system after the bridge has once been balanced. The control system thereafter reverts to the control of the regular heater by the network in which the internal variable impedance element is the only element effective to affect the balance of the network.

It is therefore an object of this invention to provide an improved control apparatus.

Another object of the invention is to provide an improved temperature control apparatus.

A further object of the invention is to provide an improved temperature control apparatus for gyroscopes.

These and other objects of the invention will become apparent from a reading of the following specification and appended claims in conjunction with the accompanying drawing in which:

Figure 1 is a schematic representative of a floated gyro with which the present invention may be used; and Figure 2 is a schematic wiring diagram of the temperature control system for controlling the means used to maintain the temperature of the gyroscope shown in Figure 1 at a desired point.

A floated gyroscope generally identified by the reference numeral 10 comprises a base portion 12 which serves as a mount for a gimbal support 14 which is of a general hollow cylindrical shape. A hermetically sealed gimbal 16 is positioned inside of gimbal support 14 and is journalled in suitable bearing means 18 and 20 which are located respectively in base portion 12 and gimbal support 14 and which define an output axis of the gyroscope. Suitable viscous fluid 22 is disposed inside of gimbal support 14 and serves to suspend gimbal 16 in substantial neutral suspension, the average density of gimbal 16 and fluid 22 at the desired operating temperature being substantially the same.

A spin motor schematically shown within gimbal 16 is identified by reference numeral 24 and is adapted to be rotated by means not shown about a spin axis normal to the output axis defined by bearing means 18 and 20. An outer housing 26 is positioned over gimbal support 14 and fits into a suitable annular recess in the base member 12.

A pair of heating elements 28 and 30 are mounted on the outer surface of gimbal support 14 and are fastened thereto by suitable means. First and second heating means 28 and 30 may include resistive windings or other suitable means for dissipating heat. It will be appreciated that most of the heat dissipated by heating means 28 and 30 will be transferred into the interior of the gyroscopic device 10 tending to raise the temperature of the viscous fluid 22.

Figure 2 shows the system which controls the energization of heating means 28 and 30 and elements in the schematic diagram of Figure 2 which are contained within housing 26 have accordingly been encircled by a dotted line and the line has been identified by reference numeral 26 corresponding to the housing. For example, the regular or standby heater 28 and the warm up heater 30 are shown encircled by dotted lines 26.

The control apparatus comprises a balanceable bridge network 34 of the Wheatstone type having four arms meeting at junction points identified respectively as A, B, C, and D. A pair of equal impedance elements 36 and 38 are connected respectively in arms AD and CD of the network 34. A thermally responsive variable impedance 40 is connected in arm AB of the network 34 and is physically positioned within the gyroscopic device 10 as is indicated in Figure 2 by being enclosed within a dotted line 26. A pair of impedance elements 42 and 44 are serially connected in arm BC of the network 34 having a junction point 45 therebetween. A thermally responsive variable impedance means 46 is connected by suitable connections 47 and 48 to junction points B and 45 respectively so that impedance means 46 is in shunting relationship with impedance member 44 in arm BC of the network. Thermally responsive variable impedance 46 is adapted to be exposed to the ambient temperature of the gyroscopic device 10 and has a negative temperature coefficient so that its equivalent resistance decreases as the ambient temperature increases.

A suitable source of electromotive force 50 is connected to a pair of terminals 51 and 52 which in turn are connected to points A and C of network 34 through suitable connection means 53 and 54 respectively.

A suitable amplifier 56 has a pair of input terminals 57 and 58 which are respectively connected by suitable connection means 59 and 60 to terminal points D and B of the bridge network 34. Terminal D is grounded as at 62.

Amplifier 56 further includes a pair of output terminals 64 and 65 which are connected by a pair of leads 66 and 67 to opposite ends of a winding 69 of a relay 68 and which further comprises a fixed contact 70 and a movable contact arm 71. The normal position of movable contact arm 71 is such that it is out of engagement with fixed contact 70 when winding 69 of the relay is de-energized.

A thermal time delay relay 74 includes a heating element 76 having terminals 77 and 78 on opposite ends thereof and a movable contact arm 79 and a fixed contact 80. The thermal time delay relay 74 is adapted to be subjected to the ambient temperature and is designed so that when heater 76 is de-energized the movable contact arm 79 will be in engagement with the fixed contact 80. Conversely, when the heater 76 is energized, after a suitable time delay, the movable contact arm 79 will disengage itself from the fixed contact 80.

A thermostat 84 is provided and comprises a movable contact arm 85 and a fixed contact 86. The thermostat 84 is designed so that the movable contact arm 85 will be in engagement with the fixed contact 86 for temperatures below a certain "break point." Thermostatic device 84 is subjected to the ambient temperature of the gyroscopic device 10 and the design is such that when the ambient temperature of the gyroscopic device 10 exceeds the "break point" then movable contact arm 85 will disengage itself from the fixed contact 86.

A relay 90 comprises a winding 91 having terminal means 92 and 93 on opposite ends thereof; a first movable contact arm 94 with a cooperating "in contact" 95; a second movable contact arm 96 and a cooperating "in contact" 97; a third movable contact arm 98 and a cooperating "out contact" 99; and a fourth movable contact arm 100 and a cooperating "out contact" 101.

Regular heater 28 is provided with terminals 25 and 27 on opposite ends thereof and auxiliary or warm-up heater 30 is provided with terminals 31 and 33 on opposite ends thereof.

A suitable source of electromotive force 110 is connected to a pair of input terminals 111 and 112. Terminal 111 is connected to movable contact 71 of relay 68 through a lead 114, a manually operated switch 116, and a suitable connection lead 118. Fixed contact 70 of relay 68 in turn is connected to the movable contact member 79 of the thermal time delay relay 74 by a suitable connection lead 120. Fixed contact 80 of the thermal time delay relay 74, in turn is connected to the movable contact member 85 of the thermostat 84 through a suitable connection lead 122. Fixed contact 86 of the thermostat 84 in turn is connected to terminal 93 of the relay winding 91 of the relay 90 through a suitable connection lead 124 and the other terminal 92 of the relay winding 91 is connected to terminal 112 by a suitable connection lead 126.

The heating element 76 of the thermal time delay relay 74 is adapted to be energized whenever the manually controlled switch 116 is closed. This is accomplished by having terminal 77 thereof connected to lead 126 by a suitable connecting lead 128 and by having terminal 78 thereof connected to lead 118 by a suitable connection lead 130. Thus, whenever switch 116 is closed a circuit is complete from terminal 111 through connection lead 114, switch 116, lead 118, lead 130, resistance element 76, lead 128 and lead 126 back to terminal 112, terminals 111 and 112 as indicated above being energized by the source of electromotive force 110.

A lead 132 connects lead 120 to the first movable contact member 94 of relay 90 and a lead 134 connects lead 122 to the cooperating fixed contact 95 of relay 90. Thus, when relay 90 is energized causing movable contact 94 to engage fixed contact 95 the thermal time delay relay 74 is bypassed. A suitable source of electromotive force 136 is connected to a pair of terminals 137 and 138 which are in turn respectively connected by a pair of suitable connection leads 139 and 140 to the second movable contact member 96 of relay 90 and terminal 31 of the warm up heater 30. Another connection lead 141 connects the other terminal 33 of warm up heater 30 to fixed contact 97 cooperating with said movable contact 96. It follows that when relay 90 is energized thus causing movable contact 96 to engage fixed contact 97 that a circuit is completed energizing heater 30 from the terminals 137 and 138, the circuit being traced from terminal 137 through lead 139, movable contact 96, fixed contact 97, lead 141, terminal 33, heating element 30, terminal 31, and lead 140 to terminal 138.

A lead 143 is used to provide a connection between lead 126 (and hence terminal 112) and terminal 25 of the regular heater 28. The other terminal 27 of heater 28 is connected by a connection lead 144 to out contact 99 of relay 90. The third movable contact 98 of relay 90 which cooperates with out contact 99 in turn is connected by a lead 145 to lead 120.

The fourth movable contact member 100 of relay 90 and its cooperating out contact 101 are used to disable the thermally responsive variable impedance means 46. This is accomplished by having a lead 146 connect movable contact member 100 to one side of impedance member 46 and by having another lead 148 connect fixed contact 101 to the other side of impedance member 46. When relay 90 is de-energized thus causing movable contact 100 to be in engagement with fixed contact 101 the thermally responsive variable impedance will be shunted out of the bridge network by connection leads 146 and 148 and contacts 100 and 101.

*Operation*

To explain the operation of the temperature control system it will first be assumed that the ambient temperature of the gyroscopic device 10 is below the "break point" and that the gyroscopic device has not been used for some time. Due to the low ambient temperature it follows that the internal temperature of the gyro will be below the desired control point and accordingly the thermally responsive variable impedance 40 positioned within housing 26 of the gyroscopic device 10 will sense this lower temperature and accordingly unbalance the bridge network 34, applying a control signal to input terminals 57 and 58 of amplifier 56. Amplifier 56 in turn will amplify the control signal and energize relay winding 69 of the relay 68 thus causing movable contact 71 thereof to engage fixed contact 70. Then, when manual switch 116 is operated so as to complete a circuit between leads 114 and 118 a circuit will be established to energize winding 91 of relay 90. The energization of relay winding 91 is as follows: from terminal 111 through lead 114, switch 116, lead 118, movable contact 71 of relay 68, fixed contact 70 of relay 68, lead 120, movable contact 79 of thermal time delay relay 74, fixed contact 80 of relay 74, lead 122, movable contact 85 of thermostat 84, fixed contact 86 of thermostat 84, lead 124, relay winding 91, and lead 126 back to terminal 112. Accordingly, relay 90 will be energized thus actuating its four movable contact members 94, 96, 98 and 100.

Also, as soon as switch 116 is closed the energization circuit for the heating member 76 of the thermal time delay relay 74 is established and current will flow through the heater 76 by the circuit means described above. The effect of the heating of element 76 is to open contacts 79 and 80 of the relay 74 after a suitable time delay. However, as long as relay 90 is energized the control effect of thermal time delay relay 74 is nullified in as much as the movable contact 94 of relay in engagement with its fixed contact 95, as described shunts out the contacts 79 and 80 of the relay 74.

Energization of relay 90 completes the circuit as described above for energizing the warm up heater 30 and as a result thereof the heater 30 immediately begins to transfer heat into the gimbal support 14 and the viscous fluid 22 of the gyroscopic device 10.

The energization circuit for the regular heater 28 is interrupted by operation of the energization of relay 90 in as much as the energization of the heater 28 includes the movable contact 98 and its out contact 99 of the relay and when relay 90 is energized the movable contact 98 disengages itself from its out contact 99. Thus, during the time that the warm up heater 30 is being used the regular heater 28 is disabled.

Enerigization of the relay 90 also serves to insert the thermally responsive variable impedance 46 into the bridge network 34 in as much as the means disabling the impedance 46 are rendered ineffective, this being accomplished by the movable contact 100 of relay being disengaged from its fixed contact 101. The thermally responsive variable impedance 46 which, as indicated above is exposed to the ambient temperature, is effective to vary the balance of the bridge network 34. The effect of impedance 46 on the balance of the bridge network 34 is to shift the control point of the bridge network by an amount which is an inverse function of the magnitude of the ambient temperature. Thus it will be appreciated that the warm up heater 30 will be energized as long as the bridge network 34 is unbalanced. Further, the bridge will be unbalanced until the internal temperature of the gyroscopic device 10 is sufficient so that the response of the thermally responsive variable impedance 40 positioned therein will balance out the response of the thermally responsive variable impedance 46 exposed to the ambient temperature. The lower the ambient temperature which affects impedance 46, the higher the internal gyro temperature must go in order for impedance 40 to effect a balance of the bridge network 34.

After the warm up heater 30 has been energized for a sufficient length of time so that impedance 40 is sufficiently warmed up to effect a balance of bridge network 34 then the amplifier 56 will no longer receive a signal and accordingly relay 68 will be de-energized. De-energization of relay 68 in turn causes its movable contact 71 to be disengaged from its cooperating fixed contact 70 and thus the energization circuit for relay 90 is broken, causing its movable contacts 94 and 96 to become disengaged from their cooperating fixed contacts 95 and 97 and further causing the movable contacts 98 and 100 thereof to come into engagement with fixed contacts 99 and 101 respectively. Disengagement of movable contact 94 from its cooperating fixed contact 95 removes the short circuit around the contacts of the thermal time delay relay 74. It should be noted that the heater 76 of relay 74 continues to be energized regardless of the de-energization of relay 68 and hence even if relay 68 once again is energized in response to a further unbalance of bridge network 34 it is impossible to energize relay 90 in as much as the movable contact 79 of the thermal time delay 74 is disengaged from its cooperating fixed contact 80.

De-energization of relay 90 also causes the warm-up heater 30 to be de-energized due to the movable contact 96 being disengaged from its cooperating fixed contact 97. The engagement of movable contact 98 with its cooperating fixed contact 99 in response to the de-energization of relay 90 completes the circuit for the regular heater 28 through the circuit above described and thus prepares the regular heater 28 to be energized in response to the next unbalance of the bridge network 34 which in turn will energize the relay 68 and complete an energization circuit for the regular heater from terminal 111 through lead 114, switch 116, lead 118, contacts 71 and 70 of relay 68, lead 120, lead 145, contacts 98 and 99 of relay 90, lead 144, heating element 28, lead 143, and lead 126 to the other terminal 112.

The engagement of movable contact 100 with its cooperating contact 101 in response to the de-energization of relay 90 once again renders the thermally responsive variable impedance 46 ineffective to affect the balance of bridge network 34. Thus, after the initial cycle of the control apparatus the ambient temperature does not affect the control point of the bridge network 34, the balance of the network thereafter being affected only by the thermally responsive variable impedance 40 which is positioned within the housing 26.

It will be appreciated therefore that the operation of the circuit shown in Fig. 2 as described above in response to an ambient temperature below the "break point" was to energize the warm up heater 30 and maintain such energization until the thermally responsive variable impedance 40 positioned within the gyroscopic device 10 responded to a temperature above the normal control point temperature of the gyroscopic device 10, the difference between the new temperature and regular control point temperature being an inverse function of the ambient temperature. Thus the control apparatus is effective to provide a temporary change of the control point effective only during the first cycle of the apparatus, the change in control point being effective to reduce the length of time required to bring the transfer function to its desired point. It will be further appreciated that once the bridge network is balanced that the de-energization of the relay 90 resulted in the thermally responsive variable impedance 46 to be rendered ineffective or disabled so as to immediately return the complete control of the bridge network back to the impedance 40 and thus return the control point back to the desired value and that the de-energization of the relay 90 also serves to render effective the thermal time delay relay 74 so that upon further unbalance of the bridge 34 it would be impossible to energize the relay 90 again and in turn the auxiliary or warm up heater 30.

Operation of the control apparatus shown in Figure 2 when the ambient temperature is above the "break point" is comparable to prior art control systems in that the thermostat 84 in response to temperatures above the "break point" will serve to disengage the movable contact 85 thereof from the fixed contact 86 and hence the energization circuit for relay 90 can never be completed. Thus the warm-up heater 30 can never be energized and accordingly the thermally responsive variable impedance 46 is never allowed to affect the balance of the bridge network 34. Upon closing of the switch 116 when the ambient temperature is above the "break point" unbalance of bridge 34 will serve to energize relay 68 and will energize the regular heater 28 which in turn will transfer heat to the fluid 22 and the gimbal assembly 16 at a slower rate than would the warm up heater 30 if it were energized.

While I have shown and described a specific embodiment of this invention, further modifications and improvements will occur to those skilled in the art. I desire to be understood, therefore, that this invention is not limited to the particular form shown and I intend in the appended claims to cover all modifications which do not depart from the spirit and scope of this invention.

What I claim is:

1. In apparatus of the class described in combination: a housing; a hollow hermetically sealed gimbal member rotatably mounted in said housing for rotation about a first axis; a gyroscope in said gimbal member having a spin axis normal to said first axis; viscous fluid in said housing supporting said gimbal in substantially neutral suspension; a balanceable network including first and second impedance means which are variable with changes in temperature, said first impedance means being subjected to the ambient temperature of said housing and said second impedance means being subjected to a temperature inside of said housing; means normally shunting said first impedance means out of said network; means responsive to an unbalance of said network; first heat producing means mounted on said housing, adapted to be energized by said unbalance responsive means and effective when energized to increase the temperature in said housing, the combined effects of said second impedance means, said network, said unbalance responsive means and said first heat producing means when said first impedance means is shunted out of said network being to maintain the inside of said housing at a predetermined temperature and said network being balanced when said second impedance means is subjected to said predetermined temperature; thermostatic control means subjected to the ambient temperature of said housing; second heat producing means mounted on said housing, adapted to be energized by said unbalance responsive means and effective when energized to increase the temperature in said housing, the control of said second heat producing means also being affected by said thermostatic control means so that said second heat producing means is energized only when said ambient temperature is below a predetermined value; additional means controlled by said thermostatic control means for disabling said shunting means and rendering said first impedance means effective to affect the balance of said network, the combined effects of said first impedance means, said second impedance means, said network, said unbalance responsive means, said thermostatic control means, and said second heat producing means when said ambient temperature is below said predetermined value being to tend to maintain the inside of said housing at a higher temperature differing from said predetermined temperature by an amount which is an inverse function of the magnitude of said ambient temperature and said network being balanced when said second impedance means is subjected to said higher temperature; and means for disabling said second heat producing means and for rendering said shunting means effective once said network has been balanced so that the balance of said network thereafter is affected only by said second impedance means.

2. In apparatus of the class described in combination: a housing; a gyroscopic member mounted in said housing for rotation about an axis; a balanceable network including first and second impedance means which are variable with changes in temperature, said first impedance means being subjected to the ambient temperature of said housing and said second impedance means being subjected to the temperature inside of said housing; means normally shunting said first impedance means out of said network; means responsive to an unbalance of said network; first temperature changing means adapted to be energized by said unbalance responsive means and effective when energized to change the temperature in said housing, the combined effects of said second impedance means, said network, said unbalance responsive means and said first temperature changing means when said first impedance means is shunted out of said network being to maintain the inside of said housing at a predetermined temperature and said network being balanced when said second impedance means is subjected to said predetermined temperature; thermostatic control means subjected to the ambient temperature of said housing and adapted to perform a control function when said ambient temperature differs a predetermined amount from said predetermined temperature; second temperature changing means adapted to be energized by said unbalance responsive means and effective when energized to change the temperature in said housing, the energization of said second temperature changing means also being controlled by said thermostatic control means so that said second temperature changing means is energized only when said ambient temperature differs a predetermined amount from said predetermined temperature; additional means controlled by said thermostatic control means for disabling said shunting means and rendering said first impedance means effective to affect the balance of said network, the combined effects of said first impedance means, said second impedance means, said network, said unbalance responsive means, said thermostatic control means, and said second temperature changing means when said thermostatic control means is performing its control function being to tend to maintain the temperature inside said housing at a temperature differing from said predetermined temperature by an amount which is an inverse function of the magnitude of said ambient temperature and said network being balanced when said second impedance means is subjected to said differing temperature; and means for disabling said second temperature changing means and for rendering said shunting means effective once said network has been balanced so that the balance of said network thereafter is affected only by said second impedance means.

3. In apparatus of the class described in combination: a housing; a balanceable network including first and second impedance means which are variable with changes in temperature, said first impedance means being subjected to the ambient temperature of said housing and said second impedance means being subjected to the temperature inside of said housing; means normally disabling said first impedance means so that it has no effect on the balance of said network; means responsive to an unbalance of said network; first temperature changing means adapted to be energized by said unbalance responsive means and effective when energized to change the temperature in said housing, the combined effects of said second impedance means, said network, said unbalance responsive means and said first temperature changing means when said first impedance means is disabled being to maintain the inside of said housing at a predetermined temperature and said network being balanced when said second impedance means is subjected to said predetermined temperature; thermostatic control means subjected to the ambient temperature of said housing and adapted to perform a control function when said ambient temperature differs a predetermined amount from said predetermined temperature; second temperature changing means adapted to be energized by said unbalance responsive means and effective when energized to change the temperature in said housing, the energization of said second temperature changing means also being controlled by said thermostatic control means so that said second temperature changing means is energized only when said ambient temperature differs a predetermined amount from said predetermined temperature; additional means controlled by said thermostatic control means for disabling said disabling means and rendering said first impedance means effective to affect the balance of said network, the combined effects of said first impedance means, said second impedance means, said network, said unbalance responsive means, said thermostatic control means, and said second temperature changing means when said thermostatic control means is performing its control function being to tend to maintain the temperature inside said housing at a temperature differing from said predetermined temperature by an amount which is an inverse function of the magnitude of said ambient temperature and said network being balanced when said second impedance means is subjected to said differing temperature; and means for rendering said disabling means effective once said network has been balanced so that the balance of said network thereafter is affected only by said second impedance means.

4. Temperature control apparatus for controlling the temperature of a gyroscope comprising in combination: a gyroscope; a balanceable network including first and second impedance means which are variable in accordance with changes in temperature, said first impedance means being subjected to the ambient temperature of said gyroscope, said second impedance means being subjected to the controlled temperature of said gyroscope, and means normally shunting said first impedance means out of said network so that the balance of said network is normally affected only by said second impedance means, said network being balanced when said first impedance means is shunted out of said network by said second impedance means being subjected to a controlled temperature of a predetermined magnitude; means responsive to an unbalance of said network; first temperature changing means mounted on said gyroscope and adapted to be energized by said unbalance responsive means; thermostatic control means subjected to said ambient temperature; additional means adapted to be energized by operation of said unbalance responsive means, the control of said additional means also being affected by said thermostatic control means, said thermostatic control means permitting energization of said additional means only when said ambient temperature is below a predetermined value; second temperature changing means mounted on said gyroscope and adapted to be energized by operation of said additional means; means operated by said additional means for disabling said shunting means and rendering said first impedance means effective to affect the balance of said network, the effect of said first impedance means on said network being to change the balance point of said network as an inverse function of the magnitude of said ambient temperature; and means disabling said additional means once said balanceable network has been balanced so that said shunting means are rendered effective and so that the balance of said network is affected only by said second impedance means.

5. Temperature control apparatus comprising in combination: a balanceable network including first and second impedance means which are variable in accordance with changes in temperature, said first impedance means being subjected to an ambient temperature, said second impedance means being subjected to a controlled temperature, and means normally shunting said first impedance means out of said network so that the balance of said network is normally affected only by said second impedance means, said network being balanced when said first impedance means is shunted out of said network by said second impedance means being subjected to a controlled temperature of a predetermined magnitude; means responsive to an unbalance of said network; first temperature changing means adapted to be energized by said unbalance responsive means; thermostatic control means subjected to said ambient temperature; relay means adapted to be energized by operation of said unbalance responsive means and said thermostatic control means, said thermostatic control means permitting energization of said relay means only when said ambient temperature is below a predetermined value; second temperature changing means adapted to be energized by operation of said relay means; means operated by said relay means for disabling said shunting means and rendering said first impedance means effective to affect the balance of said network, the effect of said first impedance means on said network being to change the balance point of said network as an inverse function of said ambient temperature; and means disabling said relay means once said balanceable network has been balanced so that said shunting means are rendered effective and so that the balance of said network is affected only by said second impedance means.

6. Temperature control apparatus comprising in combination: a balanceable network including first and second impedance means which are variable in accordance with changes in temperature, said first impedance means being subjected to an ambient temperature, said second impedance means being subjected to a controlled temperature, and means normally shunting said first impedance means out of said network so that the balance of said network is normally affected only by said second impedance means, said network being balanced when said first impedance means is shunted out of said network by said second impedance means being subjected to a controlled temperature of a predetermined magnitude; means responsive to an unbalance of said network; first temperature changing means adapted to be energized by said unbalance responsive means; thermostatic control means subjected to said ambient temperature; additional means adapted to be energized by operation of said unbalance responsive means and said thermostatic control means, said thermostatic control means permitting energization of said additional means only when said ambient temperature is below a predetermined value; second temperature changing means adapted to be operated by operation of said additional means; means operated by said additional means for disabling said shunting means and rendering said first impedance means effective to affect the balance of said network, the effect of said first impedance means on said network being to change the balance point of said network as an inverse function of the magnitude of said ambient temperature; and means disabling said additional means once said balanceable network has been balanced so that said shunting means are rendered effective and so that the balance of said network is affected only by said second impedance means.

7. Temperature control apparatus comprising in combination: a balanceable network including first and second impedance means which are variable in accordance with changes in temperature, said first impedance means being subjected to an ambient temperature, said second impedance means being subjected to a controlled temperature, and means normally shunting said first impedance means out of said network so that the balance of said network is normally affected only by said second impedance means, said network being balanced when said first impedance means is shunted out of said network by said second impedance means being subjected to a predetermined temperature; means responsive to an unbalance of said network; first temperature changing means adapted to be energized by said unbalance responsive means; thermostatic control means subjected to said ambient temperature; second temperature changing means adapted to be energized by operation of said unbalance responsive means and controlled by said thermostatic control means so that said second temperature changing means can be energized only when said ambient temperature is below a predetermined value; additional means operated by operation of said unbalance responsive means and being effective to disable said shunting means so as to render said first impedance means effective to affect the balance of said network; and means disabling said additional means once said balanceable network has been balanced.

8. In apparatus for controlling the temperature of a body: first heat producing means, second heat producing means; means for positioning said first and said second heat producing means relative to said body so that heat produced by said first and said second heat producing means is transferred to said body; temperature responsive control means comprising in part a pair of contacts which are open when said control means is above a predetermined temperature and closed when said control means is below said predetermined temperature; means positioning said control means adjacent to the outside of said body so that said control means is affected by the temperature adjacent to the outside of said body; first relay means comprising coil means, a pair of normally open contacts, a first pair of normally closed contacts and a second pair of normally closed contacts; second relay means comprising coil means and a pair of normally open contacts; first power means; series circuit means connecting said first power means to said coil means of said first relay means including said normally open contacts of said second relay means and said contacts of said temperature responsive control means so that said first power means is connected to said coil means of said first relay means only when said normally open contacts of said second relay means are closed and said contacts of said temperature responsive control means are closed; second series circuit means for connecting said first power means to said first heat producing means including said first pair of normally closed contacts of said first relay means and said pair of normally open contacts of said second relay means so that said first heat producing means produces heat only when said first pair of normally closed contacts of said first relay means are closed and said pair of normally open contacts of said second relay means are closed; second power means; third series circuit means for connecting said second power means to said second heat producing means including said pair of normally open contacts of said first relay means so that said second heat producing means produces heat only when said normally open contacts of said first relay means are closed; second temperature responsive means comprising a variable impedance element varying in impedance according to the temperature of said element; means positioning said second temperature responsive means in said body so that said element is affected by the temperature of said body; third temperature responsive means comprising a variable impedance element varying in impedance according to the temperature thereof; means positioning said third temperature responsive means adjacent to the outside of said body so that said element of said third temperature responsive means is affected by the temperature adjacent to the outside of said body; means for energizing said coil means of said second relay means so as to cause said normally open contacts thereof to close, said energizing means comprising a bridge network having four arms with said impedance element of said second temperature responsive means being in one arm of said bridge and said impedance element of said third temperature responsive means being in another arm of said bridge; and circuit means for shunting out said impedance element of said third temperature responsive means including said second pair of normally closed contacts of said first relay means.

References Cited in the file of this patent

UNITED STATES PATENTS

| | | |
|---|---|---|
| 1,506,443 | Otis | Aug. 26, 1924 |
| 2,144,105 | Coleman | Jan. 17, 1939 |
| 2,265,512 | Brown et al. | Dec. 9, 1941 |
| 2,718,789 | Jorgensen et al. | Sept. 27, 1955 |